T. R. MANDERSCHEID.
RAKE.
APPLICATION FILED JULY 26, 1915.
1,212,790.
Patented Jan. 16, 1917.
2 SHEETS—SHEET 2.
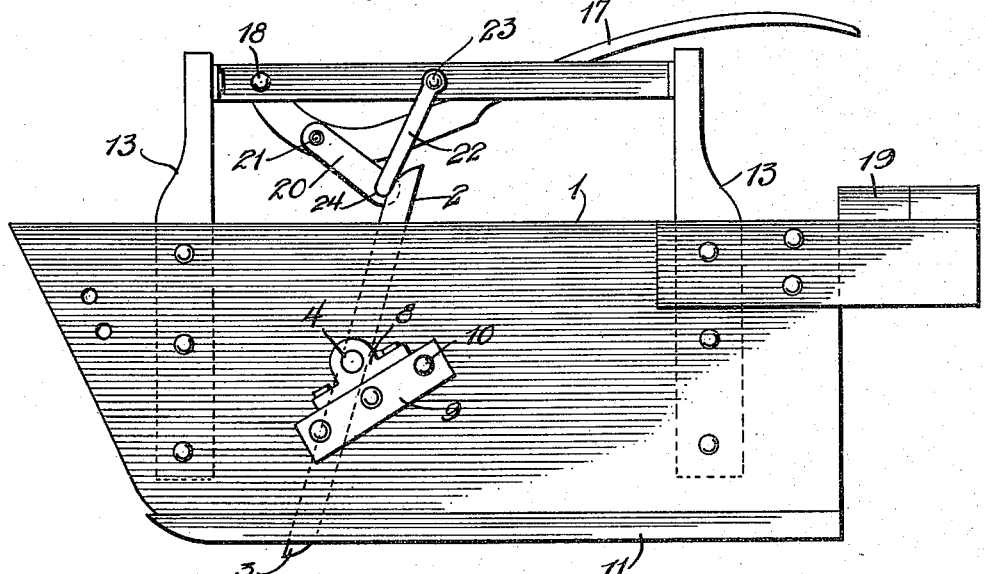
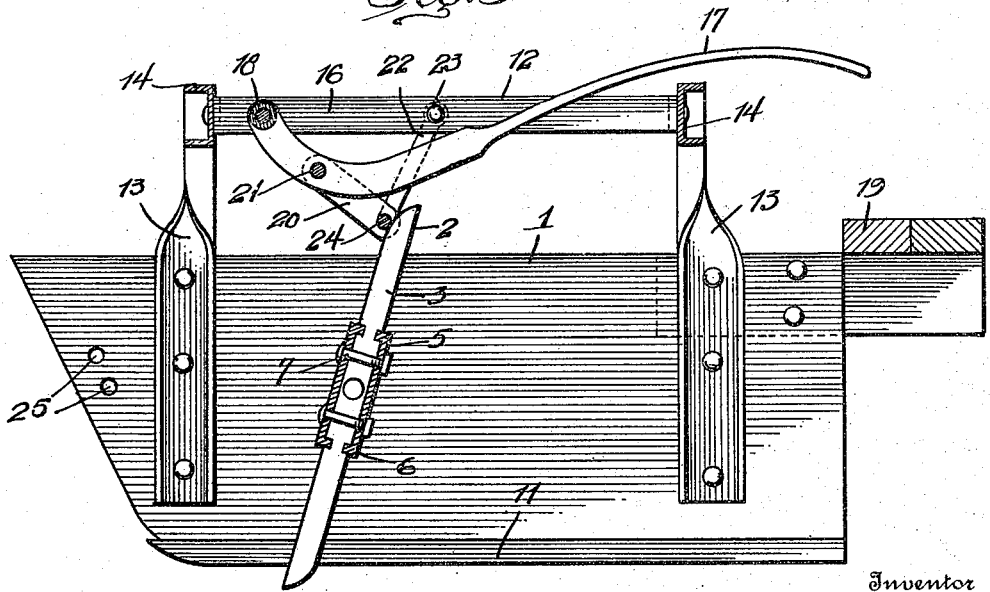
Inventor
Thomas R. Manderscheid
Witnesses
By Richard B. Owen
Attorney

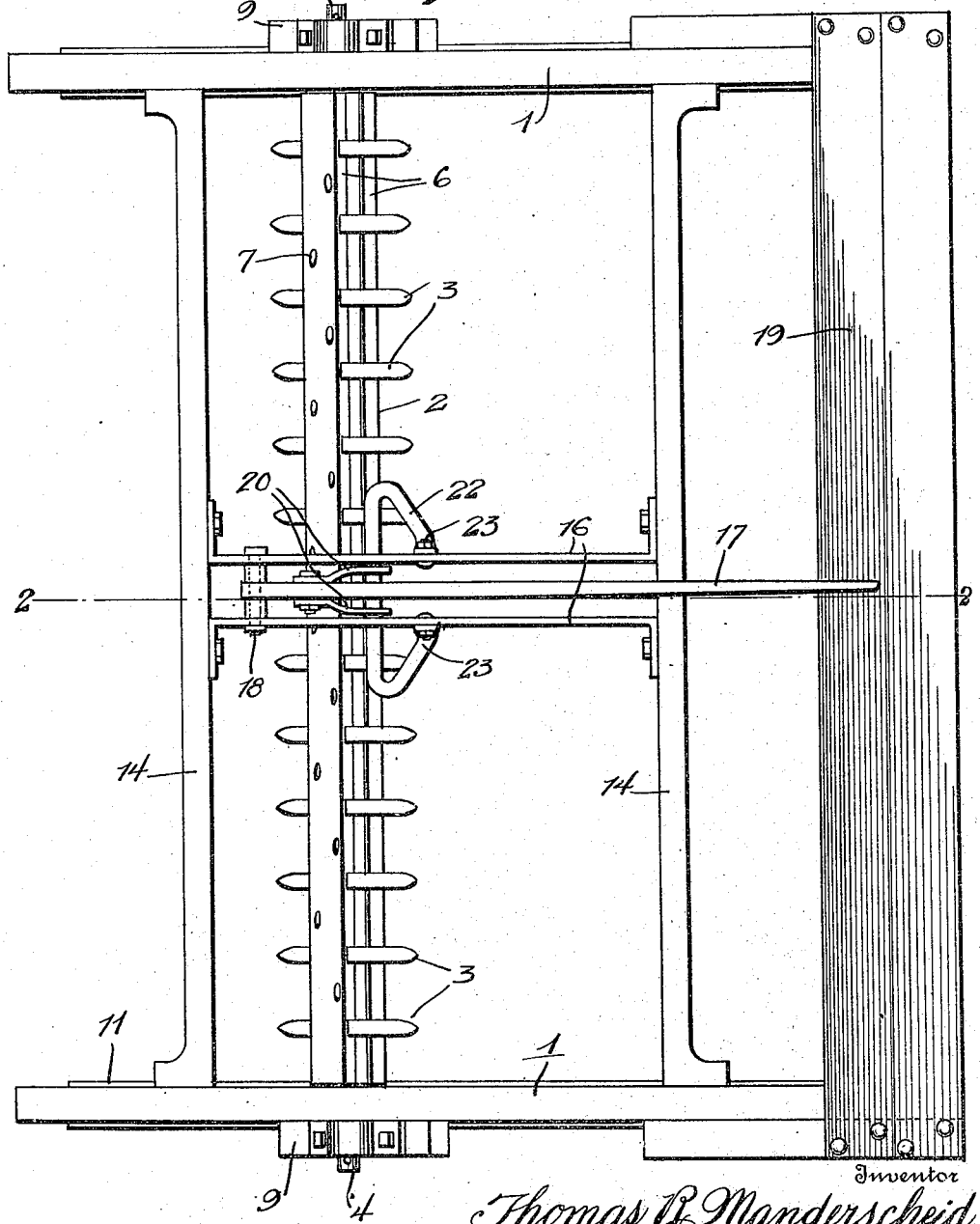

UNITED STATES PATENT OFFICE.

THOMAS RICHARD MANDERSCHEID, OF TERREBONNE, OREGON.

RAKE.

1,212,790. Specification of Letters Patent. Patented Jan. 16, 1917.

Application filed July 26, 1915. Serial No. 42,020.

*To all whom it may concern:*

Be it known that I, THOMAS R. MANDERSCHEID, a citizen of the United States, residing at Terrebonne, in the county of Crook and State of Oregon, have invented certain new and useful Improvements in Rakes, of which the following is a specification.

My invention relates to rakes and more particularly to an improved sage brush rake or "grubber."

An object of the invention is to provide a rake wherein the rake head is mounted for rotation.

A further object of the invention is to provide a novel means for releasably holding the rake head against rotation with the teeth secured thereto in raking position.

I further contemplate a lever arrangement whereby the rake head may be readily released when it is desired that the collected debris or sage brush be dumped.

In describing my invention in detail reference will be had to the accompanying drawings wherein like characters denote like or corresponding parts throughout the several views, and in which:—

Figure 1 is a top plan view of my improved sage brush rake, Fig. 2 is a side elevation, and Fig. 3 is a section of the line 2—2 of Fig. 1.

Referring now to the drawings by numerals, 1—1 designates runners which act as supports for the rake head, designated as an entirety by the numeral 2, and mounted therebetween.

The rake head 2 may be said to consist of teeth 3, spindles 4 and a shaft 5, the latter comprising a pair of spaced angle bars 6, fastened together as indicated at 7 that the teeth 3 may be clamped and securely held in place therebetween. The spindles 4, like the teeth 3, are fastened between the angle bars 6 to move therewith. The spindles 4 penetrate the runners 1—1 and engage with bearings 8 mounted on supporting blocks 9 secured as at 10 to the outside face of the respective runners. Runners are used in lieu of wheels for the reason that in actual practice runners have been found to follow a straight line course with greater accuracy and without an expenditure of a greater amount of propelling force. Each runner may be equipped with a removable ground contact shoe 11.

A suitable frame, designated as an entirety by the numeral 12 is mounted in a substantially horizontal plane above the top edge of the runners, said frame comprising a plurality of uprights 13, cross beams 14, and central brace beams 16, the latter, brace beams 16, connecting the cross beams 14, and the said beams 14 joining the uprights 13 that the frame 12 may be rigid and referred to as a unit.

An operating lever 17 is pivoted between the beams 16 at a point 18 adjacent the forward end of said beams, the lever, as shown to advantage in Figs. 2 and 3 being of an arcuate form to extend below the horizontal plane of the beams 16 and over the top edge of the rear cross beam 14. The free end of the lever 17 is in the nature of a handle and is located in proximity to a platform 19 fastened to the runners 1, that the operator standing on said platform may manipulate the lever 17 as desired. Links 20 are pivotally secured as at 21 to the lever 17 at a point adjacent the connection 18 with the beams 16, said links normally extending rearwardly and downwardly to terminate in a plane below that of the uppermost terminal, and forming one member of a toggle lever with that portion of the lever 17 between its pivotal points 18 and 21. A tie link 22 of a special formation is pivotally secured as at 23 to the beam 16 to depend therefrom and engage with the links 20 that the latter may have a loose connection therewith as indicated at 24. Said lever 22, by the location of the links 20 above pointed out, will engage with the rake head and act as a means to hold the head against rotation and the teeth 3 in raking position during advancement of the rake as a whole.

The teeth 3 of the rake are normally held at an angle to the vertical or at a slight inclination that the debris or sage brush collected may have a tendency to ride or move toward the rake head shaft 5. So long as the lever 17 is held inactive, the rake head will remain stationary. When it is desired that the rake head be automatically revolved or operated to dump the collected sage brush or debris it is but necessary to elevate the lever 17, and through movement of the links 20 connected therewith, withdraw the tie link 22 from engagement with the rake head and out of its path of movement. The tie link 22 having been thus removed, continued forward movement of the rake as a whole will cause the teeth 3 to bite into the ground and, by continued movement, revolve to ride over the pile of sage brush or debris and gravitate the opposite terminals of the teeth into engagement with the ground and into a raking position. The moment the rake head 2 is partially rotated, the lever 17 should be released that the toggle 22 may again position itself in the path of movement of the rake teeth 3 to automatically and positively hold said teeth again in a raking position and after the completion of a full half turn. The draft appliance may be affixed to the runners in any suitable manner at a point designated 25.

From the foregoing, taken in connection with the accompanying drawings it will be noted that the beam 16 is made up of spaced cross bars arranged in parallelism; that the toggle lever 22 is of a novel formation whereby to positively contact or engage with three or more of the teeth; and that the only operation necessary to dump the collected debris is as follows; viz, an upward pull upon the lever 17 and thereafter an immediate release.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent is:—

In a rake, spaced parallel runners, a transverse rotatable rake head journaled at its ends in the runners, transverse frame bars connecting the runners, central longitudinal bars connecting the frame bars, a manually operable lever journaled between said longitudinal bars, links pivoted to the lever at opposite sides of said lever forming a toggle with said lever, and a detaining U-shaped member having its terminal pivoted to the longitudinal bars and its bight portion connected to the links and engaging the teeth of the rake head to prevent rotation thereof, said U-shaped member being movable out of such engagement by manipulation of the lever.

In testimony whereof I affix my signature in presence of two witnesses.

THOMAS RICHARD MANDERSCHEID.

Witnesses:
H. A. SCHNEIDER,
INEZ BUCKNER.